United States Patent
Yurchenko et al.

(10) Patent No.: US 9,336,098 B2
(45) Date of Patent: May 10, 2016

(54) METHOD OF SYNCHRONIZING DATA

(71) Applicant: Codership Oy, Helsinki (FI)

(72) Inventors: Alexey Yurchenko, Espoo (FI); Seppo Jaakola, Helsinki (FI); Teemu Ollakka, Oulu (FI)

(73) Assignee: Codership Oy, Helsinki (FI)

( * ) Notice: Subject to any disclaimer, the term of this patent is extended or adjusted under 35 U.S.C. 154(b) by 301 days.

(21) Appl. No.: 14/220,028

(22) Filed: Mar. 19, 2014

(65) Prior Publication Data

US 2015/0269036 A1    Sep. 24, 2015

(51) Int. Cl.
*G06F 17/30*    (2006.01)
*G06F 11/14*    (2006.01)
*G06F 9/46*    (2006.01)

(52) U.S. Cl.
CPC ............ *G06F 11/1474* (2013.01); *G06F 9/466* (2013.01); *G06F 17/30575* (2013.01)

(58) Field of Classification Search
CPC .......... G06F 11/1474; G06F 17/30286; G06F 17/30067
See application file for complete search history.

(56) References Cited

U.S. PATENT DOCUMENTS

| | | | | |
|---|---|---|---|---|
| 5,890,153 | A * | 3/1999 | Fukuda | G06F 17/30362 707/704 |
| 6,182,186 | B1 * | 1/2001 | Daynes | G06F 9/52 710/108 |
| 2006/0004858 | A1 | 1/2006 | Tran et al. | |
| 2006/0031450 | A1 | 2/2006 | Unrau et al. | |
| 2009/0037507 | A1 | 2/2009 | Rosman et al. | |
| 2011/0302242 | A1 | 12/2011 | Kim et al. | |
| 2014/0044015 | A1 | 2/2014 | Chen et al. | |
| 2014/0348087 | A1 | 11/2014 | Wu et al. | |

OTHER PUBLICATIONS

Gray et al. ("Granularity of locks in a shared data base"), 1975, Proceeding VLDB '75 Proceedings of the 1st International Conference on Very Large Data Bases, pp. 428-451.*

* cited by examiner

*Primary Examiner* — Rehana Perveen
*Assistant Examiner* — Alexander Khong
(74) *Attorney, Agent, or Firm* — Ziegler IP Law Group, LLC (57) ABSTRACT

A method for use in a database cluster is provided. A given transaction is executed at a first given node of the database cluster. The first given node identifies one or more keys referenced by the given transaction. The first given node then assigns a key type to each of the one or more keys referenced by the given transaction. Accordingly, the key type is selected from a group including: exclusive; semi-exclusive; and/or shared.

26 Claims, 10 Drawing Sheets

METHOD OF SYNCHRONIZING DATA

TECHNICAL FIELD

The present disclosure generally relates to data synchronization, and more specifically, to methods of synchronizing data within a database cluster.

BACKGROUND

A typical database cluster includes a plurality of database servers that communicate with each other for data replication and data synchronization purposes. A conflict of synchronization may arise when two or more database servers execute different transactions at a resource identified by the same key substantially concurrently. The phrase "substantially concurrently" may be defined as a situation where a first transaction is executed at a first database server and a second transaction is executed at a second database server, and the timing of both the executions is such that the first database server does not have knowledge of the second transaction and/or the second database server does not have knowledge of the first transaction.

A conventional technique of detecting conflicts of synchronization is provided in "The Database State Machine and Group Communication Issues", a thesis by Fernando Pedone (1999) at Ecole Polytechnique Federale de Lausanne. The thesis is incorporated herein by reference in its entirety.

The conventional technique involves checking whether one or more keys associated with the first transaction matches with one or more keys associated with the second transaction. If it is found that there are one or more matching keys associated with both the first transaction and the second transaction, the first transaction and the second transaction are said to have a conflict of synchronization. In such a situation, at least one of the first and second transactions is rolled back.

In order to illustrate the conventional technique, let us consider a few examples. In a first example, let us consider that the first transaction modifies resources identified by keys 'a', 'b' and 'c', and is represented as 'T1(a, b, c)'. Let us also consider that the second transaction modifies resources identified by keys 'd' and 'e', and is represented as 'T2(d, e)'. In the first example, there are no matching keys between the first transaction and the second transaction. Therefore, the first transaction and the second transaction do not conflict with each other.

In a second example, let us consider that the first transaction modifies the resources identified by the keys 'b' and 'c', and is represented as 'T1(b, c)'. Let us also consider that the second transaction modifies the resource identified by the key 'b', and is represented as 'T2(b)'. In the second example, the key 'b' is associated with both the first transaction and the second transaction. Therefore, the first transaction conflicts with the second transaction.

The conventional technique works well as long as these keys identify resources that are actually being modified by the first and second transactions. However, relational databases introduce "relations" between resources. A resource modified by a transaction may depend on or be a dependency of another resource, which might be modified by another transaction.

In order to detect conflicts arising from concurrent modification of related resources by unrelated transactions, each transaction must reference keys identifying a modified resource and other resources on which the modified resource depends. For example, if a resource 'R1' depends on a resource 'Rp', then a transaction that modifies the resource 'R1' should reference keys associated with both the resources 'R1' and 'Rp'. Accordingly, the transaction may be represented as 'T(keys(R1), keys(Rp))'. This may enable detection of a conflict with another transaction that modifies the resource 'Rp' substantially concurrently.

However, this often leads to excessive false positives. For example, when two transactions modify two unrelated resources 'R1' and 'R2', both of which depend on a common unmodified resource 'Rp'. The two transactions may be represented as 'T(keys(R1), keys(Rp))' and 'T(keys(R2), keys(Rp))'. As the keys 'keys(Rp)' are associated with both the transactions, a "false positive" conflict of synchronization is detected.

Therefore, there exists a need for a method for use in a database cluster that is capable of significantly reducing occurrences of false positives during synchronization of data within the database cluster.

SUMMARY

The present disclosure seeks to provide a method of synchronizing data within a database cluster.

In one aspect, embodiments of the present disclosure provide a method for use in a database cluster. The database cluster includes a plurality of nodes. The nodes are coupled in communication, and are operable to exchange data amongst themselves. For illustration purposes herein, let us consider that a given transaction is executed at a first given node of the database cluster.

During execution of the given transaction, the first given node identifies one or more keys referenced by the given transaction. The first given node then assigns a key type to each of the one or more keys referenced by the given transaction. Accordingly, the key type is selected from a group including: exclusive; semi-exclusive; and/or shared.

For a given key from the one or more keys, the key type is assigned as follows:
(i) the exclusive key type is assigned, when the given transaction creates or deletes a resource identified by the given key;
(ii) the semi-exclusive key type is assigned, when the given transaction updates the resource identified by the given key; and
(iii) the shared key type is assigned, when the given transaction does not modify the resource identified by the given key and the resource has a dependency relationship with another resource that is modified by the given transaction.

The first given node includes the one or more keys of a given write-set pertaining to the given transaction. The first given node then communicates the given write-set to other nodes of the database cluster. For illustration purposes herein, let us consider that the first given node communicates the given write-set to a second given node of the database cluster.

The first given node and/or the second given node then perform a certification process as described hereinafter. For illustration purposes herein, the certification process has been described with reference to the second given node. It is to be noted here that the certification process is beneficially performed by each node of the database cluster.

During a certification process, each node, such as the second given node, looks up the one or more keys in its look-up table. The look-up table includes information about transactions that were previously certified within the database cluster (hereinafter referred to as "previously certified transactions"). As an example, the look-up table includes keys referenced by previously certified transactions and their respective key types.

For a key that is referenced by both the given transaction and a previously certified transaction, each node compares a key type of the key associated with the given transaction (hereinafter referred to as "key type associated with the given transaction") with a key type of the key associated with the previously certified transaction (hereinafter referred to as "key type associated with the previously certified transaction"). Based on the comparison, a node detects a conflict, when:

(i) either the key type associated with the given transaction or the key type associated with the previously certified transaction is exclusive; or (ii) both the key type associated with the given transaction and the key type associated with the previously certified transaction are semi-exclusive.

Likewise, each node performs the certification process for each key that is referenced by the given transaction and at least one of the previously certified transactions.

When a conflict is detected, each node discards the given transaction, while the first given node rolls back the given transaction.

When no conflict is detected, each node executes and commits the given transaction, while the first given node commits the given transaction. Moreover, each node populates its look-up table with each of the one or more keys referenced by the given transaction.

In another aspect, embodiments of the present disclosure provide a system including a memory and a processor coupled to the memory, wherein the processor is configured to perform the aforementioned method.

In yet another aspect, embodiments of the present disclosure provide a computer program product that includes a non-transitory machine-readable storage medium including data that, when accessed by a processor, causes the processor to perform one or more aspects of the method described herein.

Embodiments of the present disclosure substantially eliminate, or at least partially address, the aforementioned problems in the prior art, and facilitating significant reduction in occurrence of false positives during synchronization of data within a database cluster.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Embodiments of the present disclosure provide a method for use in a database cluster. The database cluster includes a plurality of nodes. The nodes are coupled in communication, and are operable to exchange data amongst themselves. For illustration purposes herein, let us consider that a given transaction is executed at a first given node of the database cluster.

During execution of the given transaction, the first given node identifies one or more keys referenced by the given transaction. The first given node then assigns a key type to each of the one or more keys referenced by the given transaction. Accordingly, the key type is selected from a group including: exclusive; semi-exclusive; and/or shared.

For a given key from the one or more keys, the key type is assigned as follows:

(i) the exclusive key type is assigned, when the given transaction creates or deletes a resource identified by the given key;

(ii) the semi-exclusive key type is assigned, when the given transaction updates the resource identified by the given key; and (iii) the shared key type is assigned, when the given transaction does not modify the resource identified by the given key and the resource has a dependency relationship with another resource that is modified by the given transaction.

Subsequently, the first given node includes one or more keys of a given write-set pertaining to the given transaction. The first given node then communicates the given write-set to other nodes of the database cluster. For illustration purposes herein, let us consider that the first given node communicates the given write-set to a second given node of the database cluster.

The first given node and/or the second given node then perform a certification process as described hereinafter. For illustration purposes herein, the certification process has been described with reference to the second given node. It is to be noted here that the certification process is beneficially performed by each node of the database cluster.

During the certification process, the second given node looks up for the one or more keys in its look-up table. The look-up table includes information about transactions that were previously certified within the database cluster (hereinafter referred to as "previously certified transactions"). In an example, the look-up table includes keys referenced by previously certified transactions and their respective key types.

For a key that is referenced by both the given transaction and a previously certified transaction, the second given node checks whether the given transaction and the previously certified transaction were executed substantially concurrently. In other words, the second given node checks whether the previously certified transaction was committed during a time period of the certification process of the given transaction.

If it is found that the given transaction and the previously certified transaction were executed substantially concurrently, the second given node compares a key type of the key associated with the given transaction (hereinafter referred to as "key type associated with the given transaction") with a key type of the key associated with the previously certified transaction (hereinafter referred to as "key type associated with the previously certified transaction"). Based on the comparison, the second given node detects a conflict, when:
(i) either the key type associated with the given transaction or the key type associated with the previously certified transaction is exclusive; or
(ii) both the key type associated with the given transaction and the key type associated with the previously certified transaction are semi-exclusive.

Likewise, the second given node performs the certification process for each key that is referenced by the given transaction and at least one of the previously certified transactions.

When a conflict is detected, the second given node discards the given transaction, while the first given node rolls back the given transaction.

When no conflict is detected, the second given node executes and commits the given transaction, while the first given node commits the given transaction. Moreover, the second given node populates its look-up table with each of the one or more keys referenced by the given transaction.

GLOSSARY

Brief definitions of terms used throughout the present disclosure are given below.

The term "database" generally refers to an organized collection of machine-readable data.

The term "relational database" generally refers to a database that implements a relational model, as is generally understood.

The term "Database Management System (DBMS)" generally refers to a software application specially designed to manage and manipulate resources in a database. The DBMS provides an interface, such as an Application Programming Interface (API) or a Structured Query Language (SQL) for performing basic database operations, such as create, read, update, and delete (often referred to as CRUD).

The term "Relational Database Management System (RDBMS)" generally refers to a type of DBMS that incorporates relationships between resources, such as tables, rows and entries.

The term "database cluster" generally refers to a plurality of database servers or nodes, wherein each database server or node includes a DBMS. Each node resides in its own process space and may reside on the same server or different servers. Each node maintains a copy of a portion or all of resources from other nodes within the database cluster. The nodes are configured to communicate with other nodes, in order to synchronize the resources such that all copies of a particular resource contain the same data.

The terms "modify" and "modified" generally refer to any type of change to a resource including create, delete or update operations.

The term "update" generally refers to a change to data in a resource.

The term "transaction" generally refers to a set of one or more data operations that are grouped together, such that either all of these operations execute and have their corresponding results committed, or none of these results are committed. A transaction is typically executed in two phases. In a first phase, all operations in the transaction are executed, and the results are saved in a temporary storage. In a second phase, the results are written to databases within a database cluster. The second phase of writing the results to the databases is often referred to as committing the transaction. After the first phase is completed, a determination can be made as to whether it is desired to commit the transaction. In case of a conflict of synchronization, the transaction is rolled back, i.e., the temporary results are discarded and the databases are not modified.

The term "client" generally refers to an application, program, process or device in a client/server relationship that requests information or services from another program, process or device (a server) on a communication network. Importantly, the terms "client" and "server" are relative since an application may be a client to one application but a server to another. The term "client" also encompasses software that makes the connection between a requesting application, program, process or device to a server possible, such as an FTP client.

The term "server" generally refers to an application, program, process or device in a client/server relationship that responds to requests for information or services by another program, process or device (a server) on a communication network. The term "server" also encompasses software that makes the act of serving information or providing services possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment," "in accordance with an embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

Figure 1:
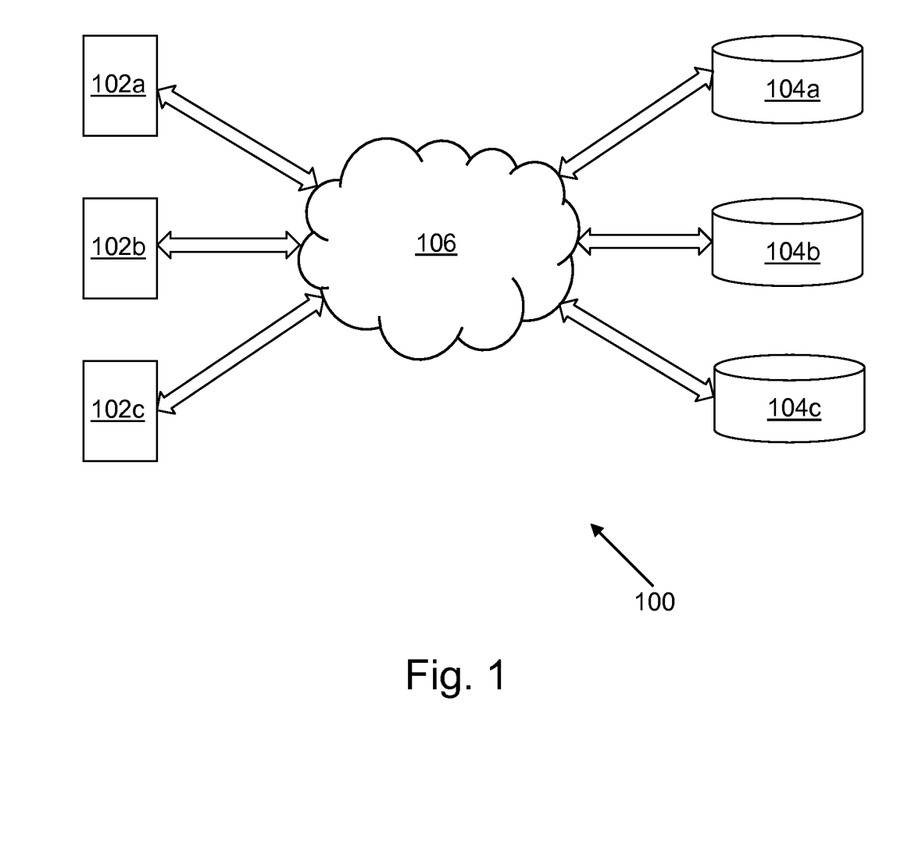
FIG. 1 is a schematic illustration of an example network environment in which a database cluster is implemented pursuant to the present disclosure.

Referring now to the drawings, particularly by their reference numbers, FIG. 1 is a schematic illustration of an example network environment 100 in which a database cluster is implemented pursuant to the present disclosure. The network environment 100 includes one or more clients, depicted as a client 102a, a client 102b and a client 102c (hereinafter collectively referred to as clients 102). Additionally, the network environment 100 includes a plurality of nodes, depicted as a node 104a, a node 104b and a node 104c (hereinafter collectively referred to as nodes 104). The nodes 104 form the database cluster.

The nodes 104 may, for example, be database servers, processes associated with databases, or computing devices dedicated to running such processes. The nodes 104 may be installed at separate hardware or at same hardware. In an example, the nodes 104 are optionally distributed geographically. In another example, the nodes 104 are optionally implemented as a cloud service.

Further, the network environment 100 also includes one or more communication networks, depicted as a communication network 106 in FIG. 1. Optionally, the communication network 106 couples some or all of the nodes 104 in communication for exchanging data amongst the nodes 104.

Additionally or alternatively, some of the nodes 104 are coupled in communication via another communication network that is isolated from the communication network 106.

Additionally or alternatively, some of the nodes 104 are coupled in communication via non-network means, for example, such as Unix domain sockets.

The communication network 106 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

The communication network 106 also provides a communication medium between the clients 102 and the nodes 104. Consequently, the clients 102 are operable to access the nodes 104 via the communication network 106. In some examples, the clients 102 are web services that allow users to access the nodes 104. Accordingly, the clients 102 are optionally operable to perform read and/or write operations on the nodes 104.

When a given transaction is executed on a given node, the given node assigns a key type to each key referenced by the given transaction.

Subsequently, the given node includes the one or more keys of a given write-set pertaining to the given transaction. The given node then communicates the given write-set to other nodes of the database cluster.

Each node of the database cluster performs a certification process, as will be described in conjunction with FIGS. 2A and 2B.

When a conflict is detected, the other nodes discard the given transaction, while the given node rolls back the given transaction.

When no conflict is detected, the other nodes execute and commit the given transaction, while the given node commits the given transaction. In this manner, data is synchronized within the database cluster.

Once the given transaction is committed, each node of the database cluster optionally populates its respective look-up table with each of the one or more keys referenced by the given transaction. Beneficially, the look-up table is populated substantially in real time.

The look-up table optionally includes keys referenced by previously certified transactions and their respective key types. In an example, the look-up table includes key types associated with keys referenced by at least one of: a predefined number of most recent transactions committed on the given node, and/or one or more recent transactions committed on the given node during a predefined period of time. The predefined number and/or the predefined period may be defined by a system administrator of the database cluster.

Moreover, the look-up table optionally stores a single instance of each key that was referenced by one or more previously certified transactions, along with back-references to the one or more previously certified transactions. This potentially avoids storing several instances of the same key, thereby reducing computational and storage space requirements.

FIG. 1 is merely an example, which should not unduly limit the scope of the claims herein. It is to be understood that the implementation of the network environment 100 is provided as an example and is not limited to a specific type or number of nodes, clients and communication networks. A person skilled in the art will recognize many variations, alternatives, and modifications of embodiments of the present disclosure.

Figure 2A:
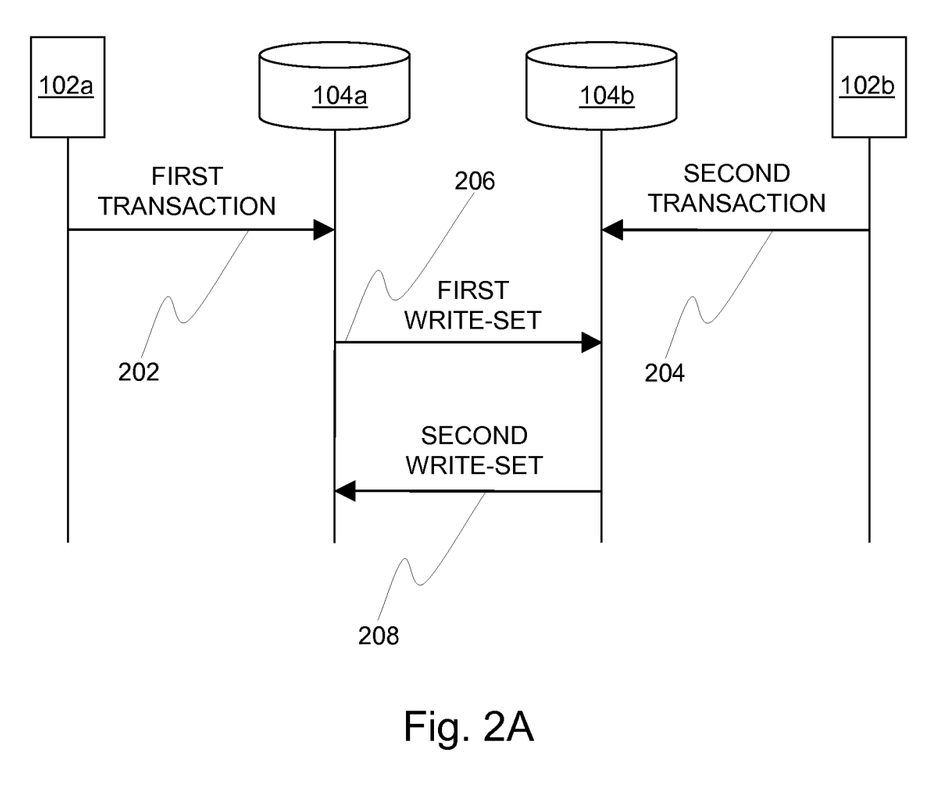
FIGS. 2A and 2B are illustrations of a data flow in an example scenario where transactions are executed on different nodes of the database cluster substantially concurrently, in accordance with an embodiment of the present disclosure.
Figure 2B:
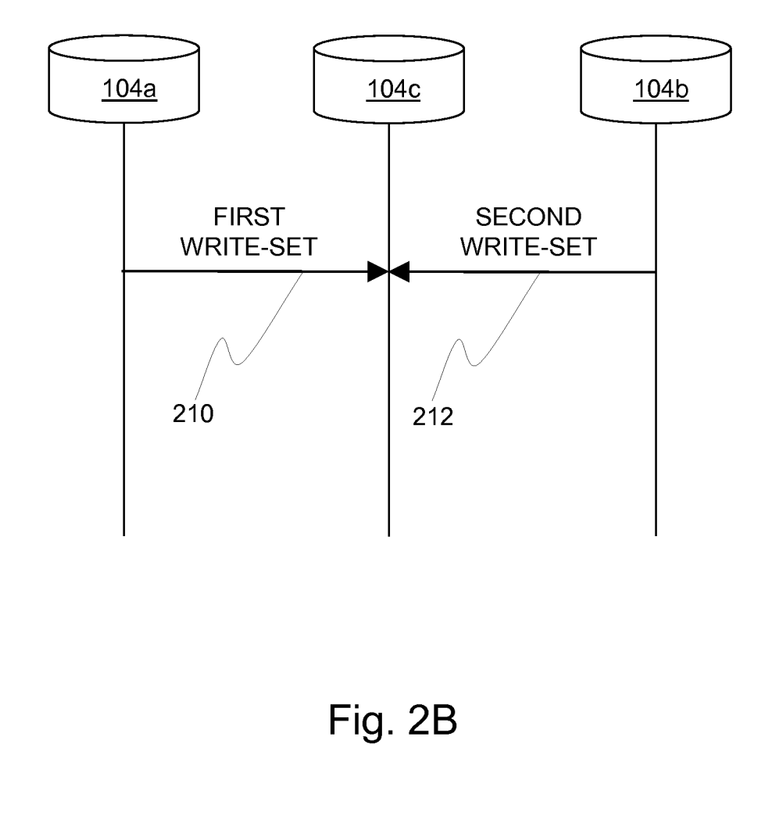

FIGS. 2A and 2B are illustrations of a data flow in an example scenario where transactions are executed on different nodes of the database cluster substantially concurrently, in accordance with an embodiment of the present disclosure. In the example scenario, let us consider that the client 102a executes a first transaction at the node 104a, while the client 102b executes a second transaction at the node 104b. Moreover, let us consider that the first transaction and the second transaction are executed substantially concurrently, i.e., at substantially the same time. Let us also consider that the first transaction is globally ordered before the second transaction within the database cluster.

The client 102a sends data pertaining to the first transaction to the node 104a, as depicted by a data flow arrow 202 in FIG. 2A. Upon receiving the data, the node 104a executes the first transaction at one or more keys referenced by the first transaction (hereinafter referred to as "first keys") within its respective database.

Similarly, the client 102b sends data pertaining to the second transaction to the node 104b, as depicted by a data flow arrow 204 in FIG. 2A. Upon receiving the data, the node 104b executes the second transaction at one or more keys referenced by the second transaction (hereinafter referred to as "second keys") within its respective database.

In order to synchronize the first transaction with the node 104b, the node 104a communicates a first write-set pertaining to the first transaction to the node 104b, as depicted by a data flow arrow 206 in FIG. 2A.

The first write-set includes a collection of data to be written and the first keys to which the data is to be written.

Moreover, the first write-set optionally includes a key type assigned to each of the first keys. For this purpose, the node 104a assigns a key type to each of the first keys. The key type is selected from a group including: exclusive; semi-exclusive; and/or shared.

In order to assign the key type to a given first key from the first keys, the node 104a checks whether or not the first transaction modifies a resource identified by the given first key. If it is found that the first transaction modifies the resource identified by the given first key, the node 104a takes into account a manner in which the resource was modified, namely, created or deleted or updated.

The exclusive key type is assigned, when the first transaction creates or deletes the resource identified by the given first key. The semi-exclusive key type is assigned, when the first transaction updates the resource identified by the given first key. The shared key type is assigned, when the first transaction does not modify the resource identified by the given first key and the resource has a dependency relationship with another resource that is modified by the first transaction. In this manner, the node 104a assigns the key type to each of the first keys.

Moreover, the node 104a optionally populates its look-up table with each of the one or more keys referenced by the given transaction.

Similarly, in order to synchronize the second transaction with the node 104a, the node 104b communicates a second write-set pertaining to the second transaction to the node 104a, as depicted by a data flow arrow 208 in FIG. 2A.

The second write-set includes a collection of data to be written and the second keys to which the data is to be written.

Moreover, the second write-set optionally includes the key type assigned to each of the one or more keys of a given write-set pertaining to the given transaction. For this purpose, the node 104b assigns a key type to each of the second keys, as described earlier.

Moreover, the node 104b optionally populates its look-up table each of the one or more keys referenced by the given transaction Furthermore, upon receiving the first write-set from the node 104a, the node 104b performs a certification process to identify whether or not one or more conflicts of synchronization have occurred.

For this purpose, the node 104b looks up for the first keys in its respective look-up table. If the node 104b finds that there is a particular key (or particular keys) that is common in both the first keys and the second keys, namely, a key that is referenced by both the first transaction and the second transaction, the node 104b compares a key type of the particular key associated with the first transaction (hereinafter referred to as "key type associated with the first transaction") with a key type of the particular key associated with the second transaction (hereinafter referred to as "key type associated with the second transaction").

Based on the comparison, the node 104b detects a conflict, when:
(i) either the key type associated with the first transaction or the key type associated with the second transaction is exclusive; or
(ii) both the key type associated with the first transaction and the key type associated with the second transaction are semi-exclusive.

Likewise, the node 104b performs the certification process for each key that is referenced by both the first transaction and the second transaction.

If the node 104b detects a conflict, the node 104b optionally resolves the conflict, for example, by employing Optimistic Concurrency Control (OCC). As the first transaction is globally ordered before the second transaction within the database cluster, the node 104b executes the first transaction at the first keys within its respective database, and commits the first transaction. Moreover, the node 104b rolls back the second transaction.

On the other hand, if no conflict is detected, the node 104b executes the first transaction at the first keys within its respective database, and commits both the first transaction and the second transaction.

Moreover, the node 104b optionally populates its look-up table with each of the first keys.

Meanwhile, upon receiving the second write-set from the node 104b, the node 104a performs the certification process to identify whether or not one or more conflicts of synchronization have occurred, as described earlier.

If the node 104a detects a conflict, the node 104a optionally resolves the conflict, as described earlier. Accordingly, the node 104a discards the second transaction, and commits the first transaction.

On the other hand, if no conflict is detected, the node 104a executes the second transaction at the second keys within its respective database, and commits both the first transaction and the second transaction. Moreover, the node 104a optionally populates its look-up table with each of the second keys.

Furthermore, the node 104a sends the first write-set pertaining to the first transaction to the node 104c, as depicted by a data flow arrow 210 in FIG. 2B. The node 104b sends the second write-set pertaining to the second transaction to the node 104c, as depicted by a data flow arrow 212 in FIG. 2B.

Upon receiving the first write-set and the second write-set, the node 104c compares the first keys included in the first write-set to the second keys included in the second write-set. Based upon the comparison, the node 104c creates a set of matching keys, so that each key in the set of matching keys is referenced by both the first transaction and the second transaction. Subsequently, the node 104c performs the certification process for each key in the set of matching keys to identify whether or not one or more conflicts of synchronization have occurred, as described earlier.

If the node 104c detects a conflict, the node 104c optionally resolves the conflict, as described earlier. Accordingly, the node 104c discards the second transaction, executes the first transaction at the first keys within its respective database, and commits the first transaction. Moreover, the node 104c optionally populates its look-up table with each of the first keys. As a result, the database cluster commits the first transaction and discards the second transaction, when a conflict is detected.

On the other hand, if no conflict is detected, the node 104c executes the first transaction and the second transaction at the first keys and the second keys, respectively, within its respective database. The node 104c then commits both the first transaction and the second transaction. Moreover, the node 104c optionally populates its look-up table with each of the first keys and each of the second keys.

In this manner, data is synchronized between the nodes 104a, 104b and 104c.

It should be noted here that the implementation of the database cluster is not limited to a specific number of nodes. FIGS. 2A and 2B are merely examples, which should not unduly limit the scope of the claims herein. A person skilled in the art will recognize many variations, alternatives, and modifications of embodiments of the present disclosure.

In order to illustrate the aforementioned certification process, let us consider a few examples.

Example 1

In a first example, let us assume that the first transaction updates a resource 'R1', which has a dependency relationship with a resource 'Rn'. The first transaction does not modify the resource 'Rn'. Thus, the key type assigned to each of the first keys may be represented as follows:

T1(semi-exclusive(R1), shared(Rn))

In the first example, let us assume that the second transaction also updates the resource 'R1', but does not modify the resource 'Rn'. Thus, the key type assigned to each of the second keys may be represented as follows:

T2(semi-exclusive(R1), shared(Rn))

During the certification process, it is found that a given key that identifies the resource 'R1' is referenced by both the first transaction and the second transaction. It is also found that both the key type of the given key associated with the first transaction and the key type of the given key associated with the second transaction are semi-exclusive. This leads to a conflict of synchronization. Consequently, the second transaction is discarded and/or rolled back.

Example 2

In a second example, let us assume that the first transaction deletes the resource 'Rn'. Thus, the key type assigned to each of the first keys may be represented as follows:

T1(exclusive(Rn))

In the second example, let us assume that the second transaction updates a resource 'R2', which has a dependency relationship with the resource 'Rn'. The second transaction does not modify the resource 'Rn'. Thus, the key type assigned to each of the second keys may be represented as follows:

T2(semi-exclusive(R2), shared(Rn))

During the certification process, it is found that a given key that identifies the resource 'Rn' is referenced by both the first transaction and the second transaction. It is also found that the key type of the given key associated with the first transaction is exclusive. This leads to a conflict of synchronization. Consequently, the second transaction is discarded and/or rolled back.

Example 3

In a third example, let us assume that the first transaction updates the resource 'R1', but does not modify the resource 'Rn'. Thus, the key type assigned to each of the first keys may be represented as follows:

T1(semi-exclusive(R1), shared(Rn))

In the third example, let us assume that the second transaction updates the resource 'Rn'. Thus, the key type assigned to each of the second keys may be represented as follows:

T2(semi-exclusive(Rn))

No conflict of synchronization is detected during the certification process. Consequently, the first transaction and the second transaction are executed at and committed to all of the nodes 104.

Example 4

In a fourth example, let us assume that the first transaction updates the resource 'R1', but does not modify the resource 'Rn'. Thus, the key type assigned to each of the first keys may be represented as follows:

T1(semi-exclusive(R1), shared(Rn))

In the fourth example, let us assume that the second transaction updates the resource 'R2', but does not modify the resource 'Rn'. Thus, the key type assigned to each of the second keys may be represented as follows:

T2(semi-exclusive(R2), shared(Rn))

No conflict of synchronization is detected during the certification process. Consequently, the first transaction and the second transaction are executed at and committed to all of the nodes 104.

Figure 3:
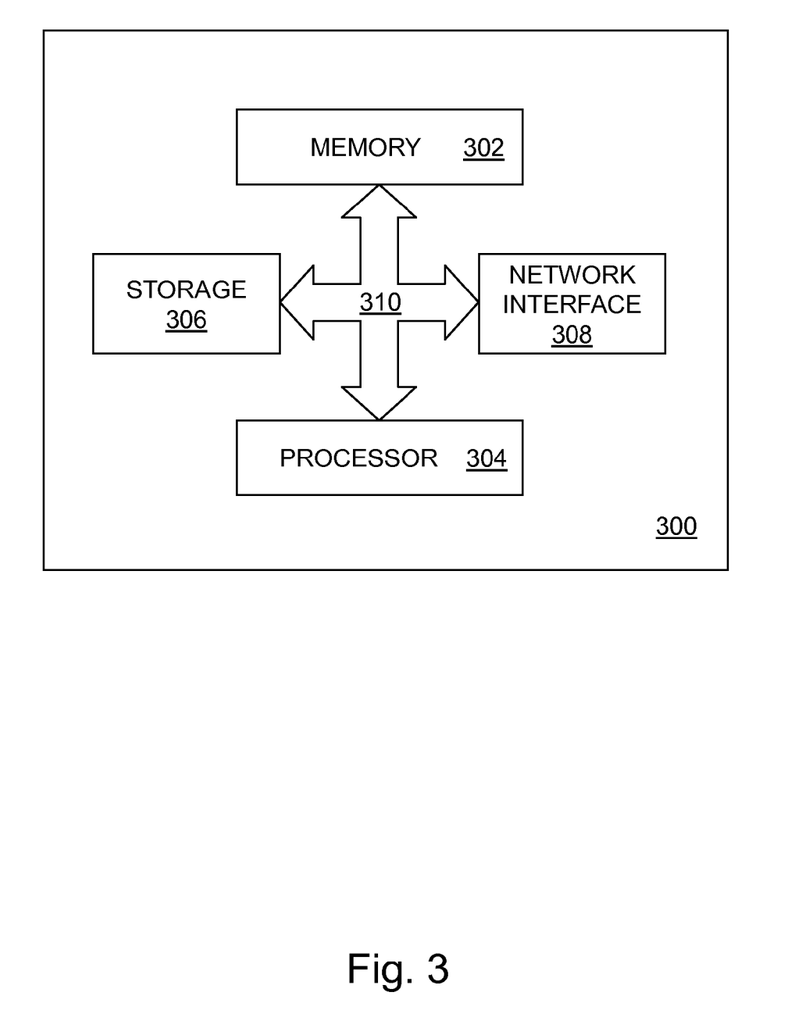
FIG. 3 is a schematic illustration of a system for use in a database cluster, in accordance with an embodiment of the present disclosure.

FIG. 3 is a schematic illustration of a system 300 for use in a database cluster, in accordance with an embodiment of the present disclosure. The system 300 could be implemented in the database cluster in a manner that is similar to the implementation of the nodes 104 as described in conjunction with FIG. 1. The system 300 could be a database server, or a computing device dedicated to running processes associated with databases. Moreover, each of the nodes 104 could be implemented as the system 300.

The system 300 includes, but is not limited to, a data memory 302, a processor 304, a data storage 306, a network interface 308, and a system bus 310 that operatively couples various components including the data memory 302, the processor 304, the data storage 306 and the network interface 308.

The system 300 also includes a power source (not shown in FIG. 3) for supplying electrical power to various components of the system 300. The power source may, for example, include a rechargeable battery.

The data memory 302 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data storage 306 is a non-transitory data storage arrangement, for example, including a database.

The network interface 308 optionally allows clients to access the system 300, and perform read and/or write operations on the database.

Moreover, the network interface 308 enables the system 300 to communicate with other nodes within the database cluster, for example, via a communication network.

Moreover, the processor 304 is configured to perform operations as will be described in conjunction with FIGS. 4A and 4B.

FIG. 3 is merely an example, which should not unduly limit the scope of the claims herein. It is to be understood that the specific designation for the system 300 is provided as an example and is not to be construed as limiting the system 300 to specific numbers, types, or arrangements of modules and/or components of the system 300. A person skilled in the art will recognize many variations, alternatives, and modifications of embodiments of the present disclosure.

Figure 4A:
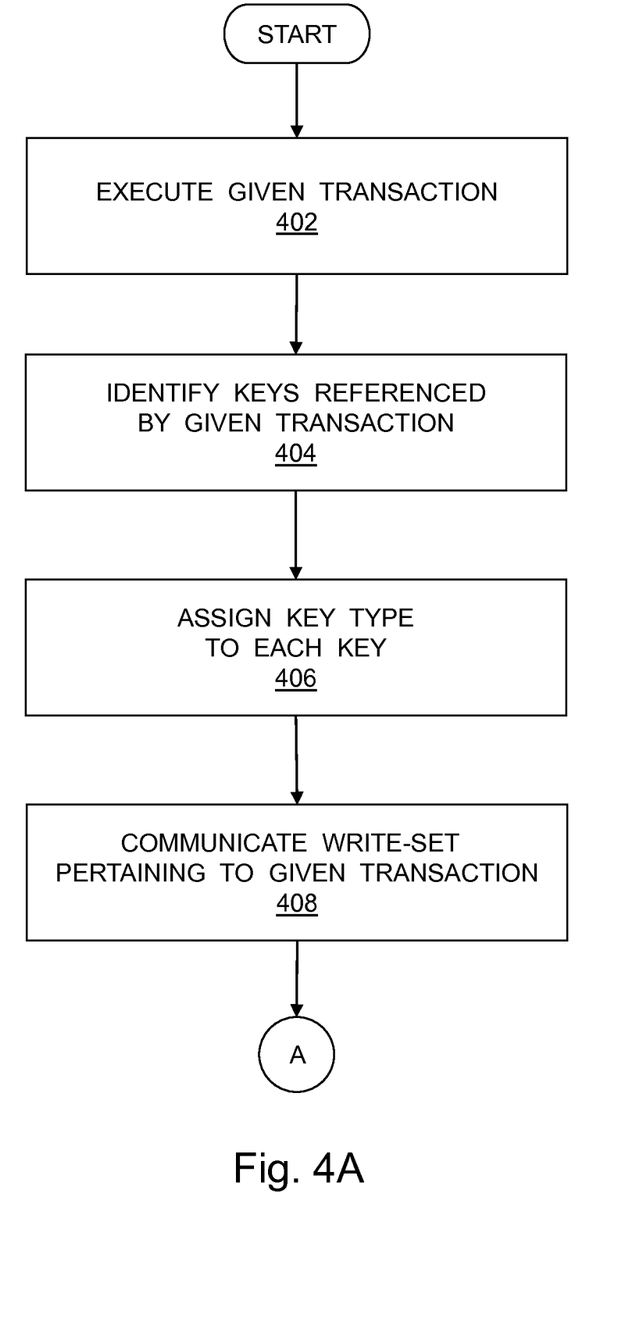
FIGS. 4A and 4B collectively are an illustration of steps of a method for use in a database cluster, in accordance with an embodiment of the present disclosure.
Figure 4B:
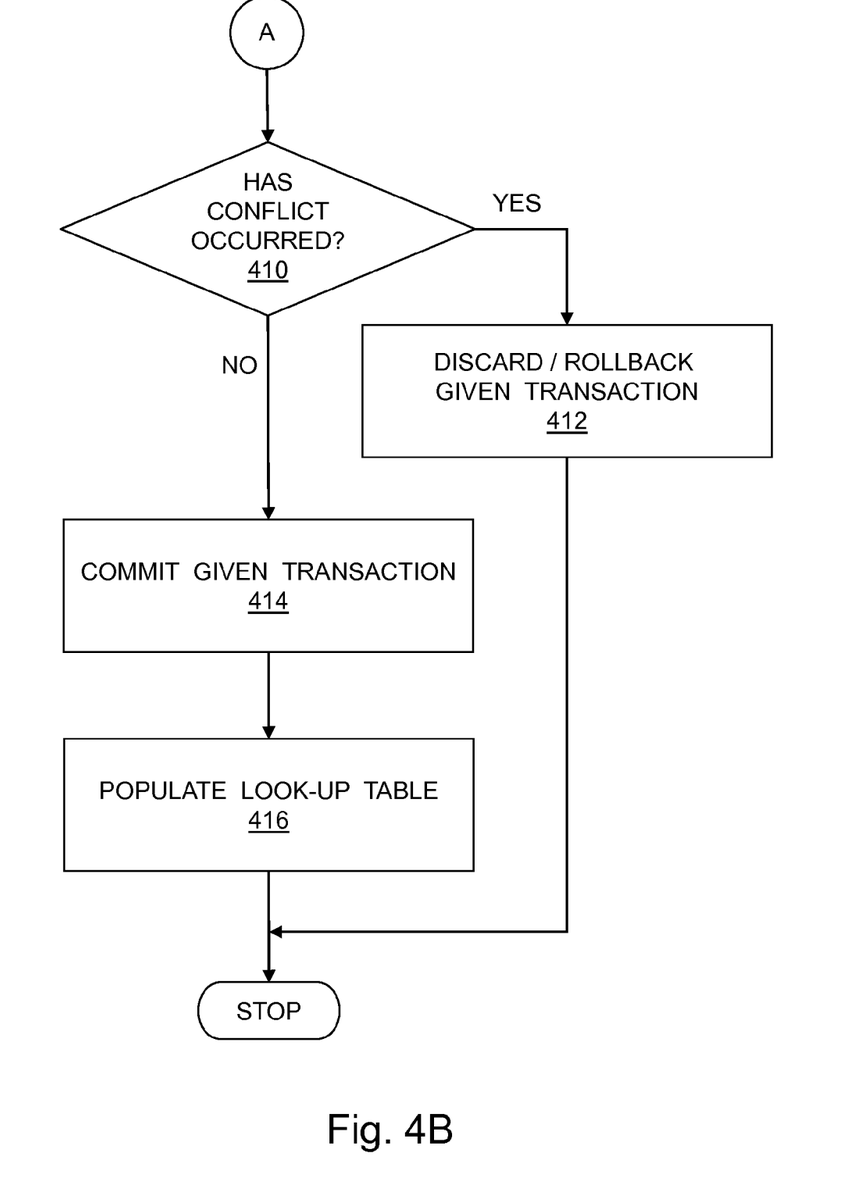

FIGS. 4A and 4B collectively are an illustration of steps of a method for use in a database cluster, in accordance with an embodiment of the present disclosure. The method is depicted as a collection of steps in a logical flow diagram, which represents a sequence of steps that can be implemented in hardware, software, or a combination thereof.

The database cluster includes a plurality of nodes. The nodes are coupled in communication, and are operable to exchange data amongst themselves.

At a step 402, a given transaction is executed at a first given node of the database cluster.

At a step 404, the first given node identifies one or more keys referenced by the given transaction.

Next, at a step 406, the first given node assigns a key type to each of the one or more keys referenced by the given transaction. Accordingly, the key type is selected from a group including: exclusive; semi-exclusive; and/or shared.

Figure 5A:
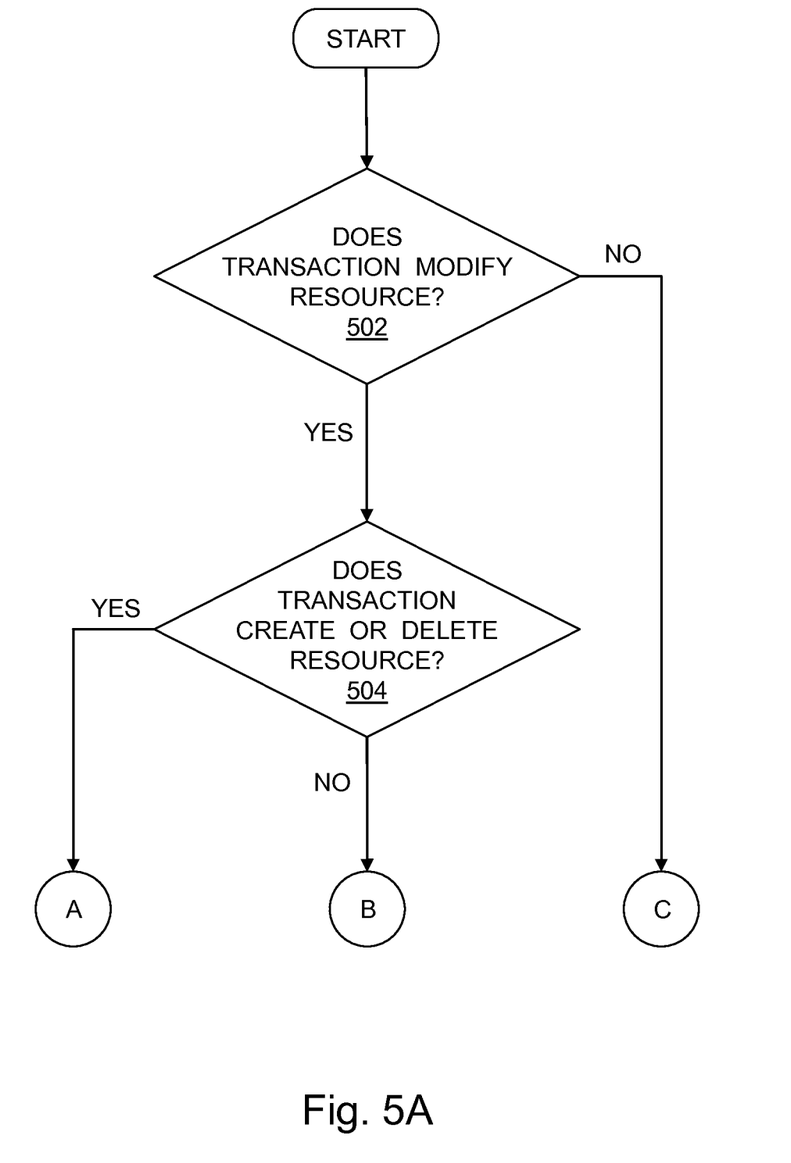
FIGS. 5A and 5B collectively are an illustration of steps of key-type assignment processing, in accordance with an embodiment of the present disclosure.
Figure 5B:
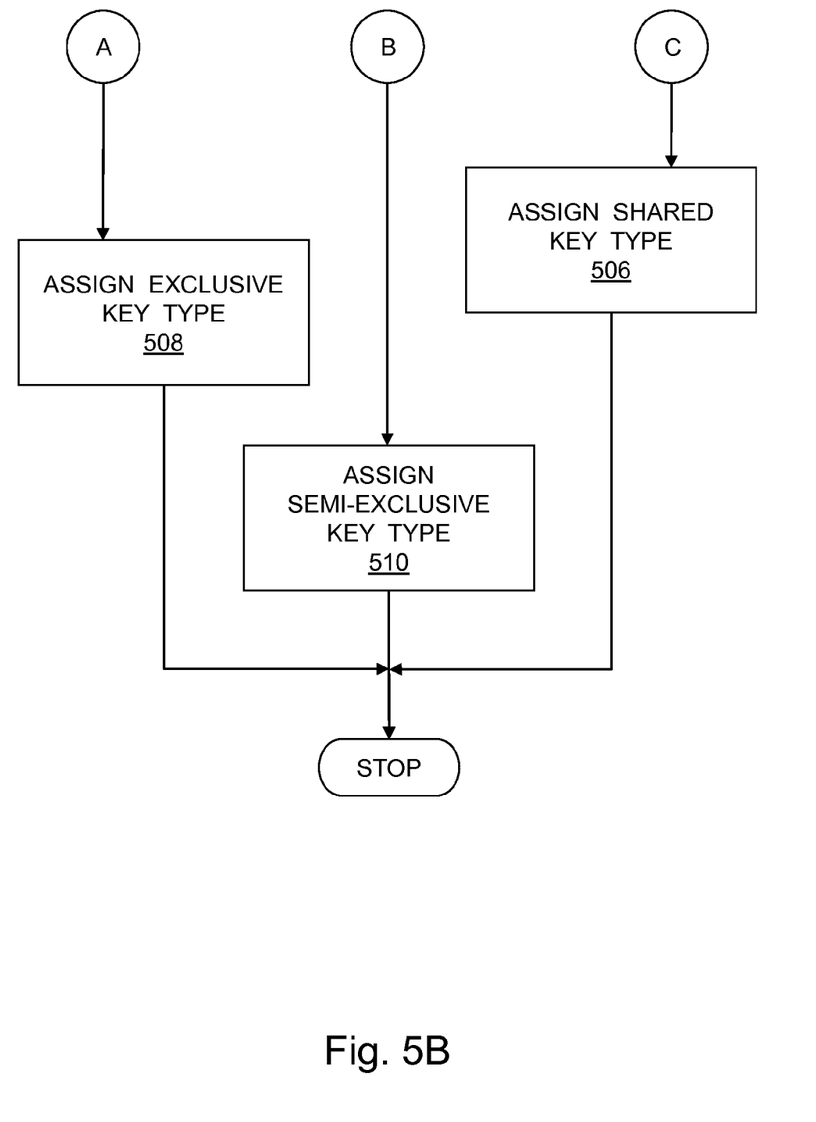

The key-type assignment process of the step 406 has been described in conjunction with FIGS. 5A and 5B.

The method optionally includes a step at which the first given node populates its look-up table with the key type assigned to each of the one or more keys referenced by the given transaction.

Subsequently, at a step 408, the first given node includes one or more keys of a given write-set pertaining to the given transaction, and communicates the given write-set to other nodes of the database cluster. For illustration purposes herein, let us consider that the first given node communicates the given write-set to a second given node of the database cluster.

At a step 410, the second given node performs a certification process on the given write-set to check whether a conflict of synchronization has occurred.

Figure 6A:
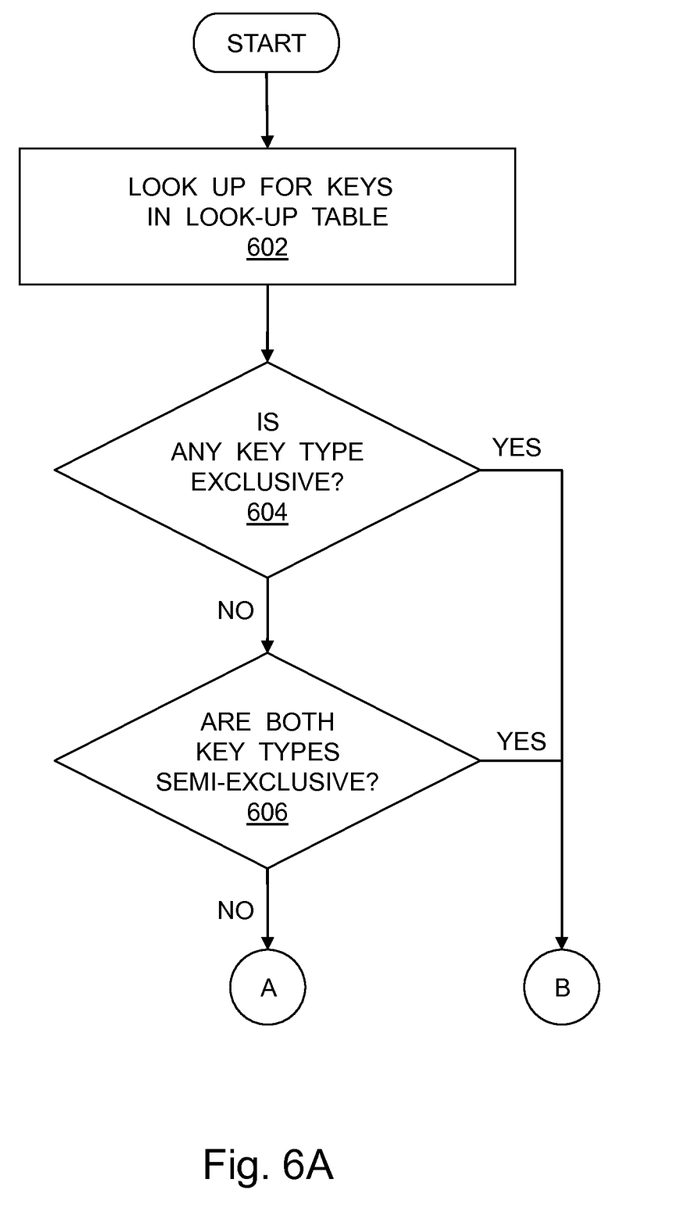
FIGS. 6A and 6B collectively are an illustration of steps of certification processing, in accordance with an embodiment of the present disclosure.
Figure 6B:
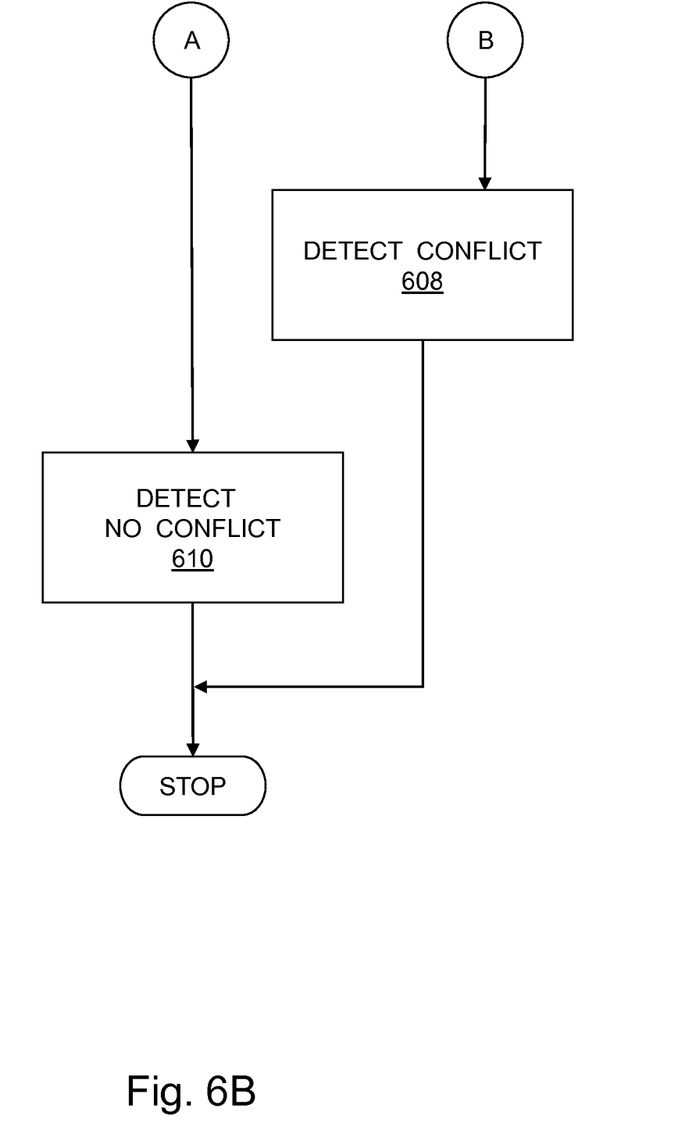

The certification process of the step 410 has been described in conjunction with FIGS. 6A and 6B.

If, at the step 410, the second given node detects a conflict, a step 412 is performed. Otherwise, if no conflict is detected, a step 414 is performed.

At the step 412, the second given node discards the given transaction, while the first given node rolls back the given transaction.

At the step 414, the second given node executes and commits the given transaction, while the first given node commits the given transaction.

Subsequently, at a step 416, each node populates its look-up table with each of the one or more keys referenced by the given transaction.

It should be noted here that the steps 402 to 416 are only illustrative and other alternatives can also be provided where one or more steps are added, one or more steps are removed, or one or more steps are provided in a different sequence without departing from the scope of the claims herein.

FIGS. 5A and 5B collectively are an illustration of steps of key-type assignment processing, in accordance with an embodiment of the present disclosure.

At a step 502, the first given node checks whether the given transaction modifies a resource identified by a given key from the one or more keys referenced by the given transaction.

If, at the step 502, it is found that the given transaction modifies the resource identified by the given key, a step 504 is performed. Otherwise, if it is found that the given transaction does not modify the resource identified by the given key, a step 506 is performed.

At the step 504, the first given node checks whether the given transaction creates or deletes or updates the resource identified by the given key. If, at the step 504, it is found that the given transaction creates or deletes the resource identified by the given key, a step 508 is performed. Otherwise, if it is found that the given transaction updates the resource identified by the given key, a step 510 is performed.

At the step 506, the shared key type is assigned.

At the step 508, the exclusive key type is assigned.

At the step 510, the semi-exclusive key type is assigned.

It should be noted here that the steps 502 to 510 are only illustrative and other alternatives can also be provided where one or more steps are added, one or more steps are removed, or one or more steps are provided in a different sequence without departing from the scope of the claims herein.

FIGS. 6A and 6B collectively are an illustration of steps of certification processing, in accordance with an embodiment of the present disclosure.

At a step 602, any given node, such as the second given node for example, looks up the one or more keys referenced by the given transaction in its look-up table. In an example, the look-up table includes keys referenced by previously certified transactions and their respective key types.

In accordance with the step 602, let us consider that the second given node finds a key that is referenced by both the given transaction and a previously certified transaction. Let us also consider that the given transaction and the previously certified transaction were executed substantially concurrently.

At a step 604, the second given node checks whether a key type of the key associated with the given transaction (hereinafter referred to as "key type associated with the given transaction") or a key type of the key associated with the previously certified transaction (hereinafter referred to as "key type associated with the previously certified transaction") is exclusive.

If, at the step 604, it is found that none of the key types is exclusive, a step 606 is performed. Otherwise, if it is found that either the key type associated with the given transaction or the key type associated with the previously certified transaction is exclusive, a step 608 is performed.

At the step 606, the given node checks whether both the key type associated with the given transaction and the key type associated with the previously certified transaction are semi-exclusive.

If, at the step 606, it is found that both the key types are semi-exclusive, the step 608 is performed. Otherwise, if it is found that both the key type associated with the given transaction and the key type associated with the previously certified transaction are not semi-exclusive, a step 610 is performed.

At the step 608, the second given node detects a conflict.

At the step 610, the second given node detects no conflict.

The steps 604 to 610 are optionally performed for each key that is referenced by the given transaction and at least one of the previously certified transactions.

It should be noted here that the steps 602 to 610 are only illustrative and other alternatives can also be provided where one or more steps are added, one or more steps are removed, or one or more steps are provided in a different sequence without departing from the scope of the claims herein. For example, the step 606 may be performed before the step 604 is performed.

Embodiments of the present disclosure provide a non-transitory machine-readable storage medium including data that, when accessed by a processor, causes the processor to perform operations as described in conjunction with FIGS. 4A-B, 5A-B, and 6A-B.

Embodiments of the present disclosure are susceptible to being used for various purposes, including, though not limited to, facilitating significant reduction in occurrence of false positives during synchronization of data within a database cluster.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for use in a database cluster, wherein the database cluster comprises a plurality of nodes, the method comprising:

executing a given transaction at a first node of the database cluster;

generating a first set of one or more keys wherein the first set of one or more keys comprises keys referenced by the given transaction; and assigning a key type to each key in the first set of one or more keys, wherein the key type is selected from a group comprising: exclusive; semi-exclusive; or shared, and wherein assigning the key type to a given key comprises:

assigning the exclusive key type when the given transaction creates or deletes a resource identified by the given key;

assigning the semi-exclusive key type when the given transaction updates the resource identified by the given key; and assigning the shared key type when the given transaction does not modify the resource identified by the given key and the resource has a dependency relationship with another resource that is modified by the given transaction.

2. The method of claim 1 comprising:

including each key and the key type assigned to each key from the first set of one or more keys into a given write-set pertaining to the given transaction; and communicating the given write-set to a second node of the database cluster.

3. The method of claim 1 comprising:

looking-up each key in the first set of one or more keys in a look-up table, wherein the look-up table comprises keys referenced by previously certified transactions and their respective key types; and detecting a conflict for a key that is referenced by both the given transaction and a previously certified transaction, when:

either a key type associated with the given transaction or a key type associated with the previously certified transaction is exclusive; or both the key type associated with the given transaction and the key type associated with the previously certified transaction are semi-exclusive.

4. The method of claim 3, wherein the given transaction and the previously certified transaction are executed substantially concurrently.

5. The method of claim 3 comprising:

rolling back the given transaction, when a conflict is detected.

6. The method of claim 3 comprising:

committing the given transaction, when no conflict is detected.

7. The method of claim 3 comprising:

populating the look-up table with each key in the first set of one or more keys referenced by the given transaction, when no conflict is detected.

8. A computer program product including non-transitory machine-readable storage medium comprising data that, when accessed by a processor, causes the processor to perform operations comprising:

executing a given transaction at a first node of the database cluster;

generating a first set of one or more keys wherein the first set of one or more keys comprises keys referenced by the given transaction; and assigning a key type to each key in the first set of one or more keys, wherein the key type is selected from a group comprising: exclusive; semi-exclusive; or shared, and wherein assigning the key type to a given key comprises:

assigning the exclusive key type when the given transaction creates or deletes a resource identified by the given key;

assigning the semi-exclusive key type when the given transaction updates the resource identified by the given key; and assigning the shared key type when the given transaction does not modify the resource identified by the given key and the resource has a dependency relationship with another resource that is modified by the given transaction.

9. The computer program product of claim 8, wherein the operations comprise:

including each key in the first set of one or more keys into a given write-set pertaining to the given transaction; and communicating the given write-set to a second node of the database cluster.

10. The computer program product of claim 8, wherein the operations comprise:

looking-up each key in the first set of one or more keys in a look-up table, wherein the look-up table comprises keys referenced by previously certified transactions and their respective key types; and detecting a conflict for a key that is referenced by both the given transaction and a previously certified transaction, when:

either a key type associated with the given transaction or a key type associated with the previously certified transaction is exclusive; or both the key type associated with the given transaction and the key type associated with the previously certified transaction are semi-exclusive.

11. The computer program product of claim 10, wherein the operations comprise:

rolling back the given transaction, when a conflict is detected.

12. The computer program product of claim 10, wherein the operations comprise:

committing the given transaction, when no conflict is detected.

13. The computer program product of claim 10, wherein the operations comprise:

populating the look-up table with each of the one or more keys, when no conflict is detected.

14. A system comprising: a memory; and a processor coupled to the memory, wherein the processor is configured to:

execute a given transaction at a first node of the database cluster;

generate a first set of one or more keys wherein the first set of one or more keys comprises keys referenced by the given transaction; and assign a key type to each key in the first set of one or more keys, wherein the key type is selected from a group comprising: exclusive; semi-exclusive; or shared, wherein assigning the key type to a given key comprises:

assigning the exclusive key type when the given transaction creates or deletes a resource identified by the given key;

assigning the semi-exclusive key type when the given transaction updates the resource identified by the given key; and assigning the shared key type when the given transaction does not modify the resource identified by the given key and the resource has a dependency relationship with another resource that is modified by the given transaction.

15. The system of claim 14, wherein the processor is configured to:
include the key type assigned to each key in the first set of one or more keys into a given write-set pertaining to the given transaction; and
communicate the given write-set to a second node of the database cluster.

16. The system of claim 14, wherein the processor is configured to:
look-up each key in the set of one or more keys in a look-up table, wherein the look-up table comprises keys referenced by previously certified transactions and their respective key types; and
detect a conflict for a key that is referenced by both the given transaction and a previously certified transaction, when:
either a key type associated with the given transaction or a key type associated with the previously certified transaction is exclusive; or
both the key type associated with the given transaction and the key type associated with the previously certified transaction are semi-exclusive.

17. The system of claim 16, wherein the given transaction and the previously certified transaction are executed substantially concurrently.

18. The system of claim 16, wherein the processor is configured to rollback the given transaction, when a conflict is detected.

19. The system of claim 16, wherein the processor is configured to commit the given transaction, when no conflict is detected.

20. The system of claim 16, wherein the processor is configured to populate the look-up table with each key in the first set of the one or more keys, when no conflict is detected.

21. A method for use in a database cluster, wherein the database cluster comprises a plurality of nodes, the method comprising:
executing a first transaction at a first node of the database cluster;
generating a first set of one or more keys wherein each the first set of one or more keys comprises keys referenced by the first transaction; and
assigning a key type to each key in the first set of one or more keys,
wherein the assigned key type is selected from a group comprising: create/delete; update; or dependent, and
wherein assigning the key type to a given key comprises:
assigning the create/delete key type when the given transaction creates or deletes a resource identified by the given key;
assigning the update key type when the given transaction updates the resource identified by the given key; and
assigning the dependent key type when the given transaction does not modify the resource identified by the given key and the resource has a dependency relationship with another resource that is modified by the given transaction.

22. The method of claim 21, comprising:
executing a second transaction at a second node of the database cluster;
generating a second set of one or more keys wherein the second set of one or more keys comprises keys referenced by the second transaction;
assigning the key type to each key in the second set of one or more keys;
determining a set of matching keys; and
detecting a conflict between the first transaction and the second transaction based at least in part on the set of matching keys,
wherein each key in the set of matching keys is in both the first set of one or more keys and the second set of one or more keys, and each key in the set of matching keys comprises a first key type pertaining to the first transaction and a second key type pertaining to the second transaction, and
wherein detecting a conflict comprises:
comparing the first key type and the second key type for each key in the set of matching keys; and
detecting a conflict when:
either the first key type of a given key or the second key type of the given is create/delete; or
both the first key type of the given key and the second key type of the given key is update.

23. The method of claim 22, wherein the first transaction and the second transaction are executed substantially simultaneously.

24. The method of claim 22, comprising rolling back the given transaction when a conflict is detected.

25. The method of claim 22, wherein the second set of keys comprises keys and associated key types referenced by one or more executed transactions.

26. The method of claim 25, wherein the first set of one or more keys and the second set of one or more keys are added to a look-up table when no conflict is detected.

* * * * *